US008655005B2

(12) United States Patent
Birger et al.

(10) Patent No.: US 8,655,005 B2
(45) Date of Patent: Feb. 18, 2014

(54) EARPHONE SYSTEM COMPRISING AN EARPHONE AND A PORTABLE HOLDING DEVICE

(75) Inventors: Johan Birger, Malmo (SE); Michael Sorensen, Jyllinge (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 13/376,770

(22) PCT Filed: Jun. 9, 2009

(86) PCT No.: PCT/DK2009/000139
§ 371 (c)(1),
(2), (4) Date: Feb. 16, 2012

(87) PCT Pub. No.: WO2010/142290
PCT Pub. Date: Dec. 16, 2010

(65) Prior Publication Data
US 2012/0140976 A1 Jun. 7, 2012

(51) Int. Cl.
*H04R 25/00* (2006.01)
(52) U.S. Cl.
USPC .......................................... 381/381; 379/430
(58) Field of Classification Search
USPC ........ 381/381, 375, 374, 380; 455/41.1, 41.2, 455/41.3, 557, 569.1, 569.2, 575.6; 379/430
See application file for complete search history.

(56) References Cited

U.S. PATENT DOCUMENTS

| | | | | |
|---|---|---|---|---|
| 5,881,149 A | * | 3/1999 | Weatherill | 379/433.02 |
| 5,943,627 A | | 8/1999 | Kim et al. | |
| 6,978,163 B2 | * | 12/2005 | Dyer et al. | 455/575.2 |
| 7,130,654 B2 | * | 10/2006 | Cho | 455/550.1 |
| 7,477,922 B2 | * | 1/2009 | Lewis | 455/569.1 |
| 7,746,028 B1 | * | 6/2010 | Yang et al. | 320/107 |
| 8,019,380 B2 | * | 9/2011 | Lin | 455/552.1 |
| 8,099,141 B2 | * | 1/2012 | Janik | 455/575.1 |
| 2004/0198470 A1 | * | 10/2004 | Dyer et al. | 455/575.1 |
| 2004/0203351 A1 | * | 10/2004 | Shearer et al. | 455/41.1 |
| 2005/0107131 A1 | * | 5/2005 | Abramov | 455/569.1 |
| 2005/0130593 A1 | | 6/2005 | Michalak | |
| 2006/0202702 A1 | | 9/2006 | Ham et al. | |
| 2007/0093279 A1 | * | 4/2007 | Janik | 455/569.1 |
| 2007/0202934 A1 | | 8/2007 | Kim | |
| 2011/0059697 A1 | * | 3/2011 | Janik | 455/41.2 |
| 2011/0237195 A1 | * | 9/2011 | Griffin et al. | 455/41.3 |
| 2012/0225699 A1 | * | 9/2012 | Griffin et al. | 455/569.1 |

FOREIGN PATENT DOCUMENTS

| | | |
|---|---|---|
| EP | 1414221 | 4/2004 |
| EP | 1536615 | 6/2005 |

\* cited by examiner

*Primary Examiner* — Mohammad Islam
*Assistant Examiner* — Phylesha Dabney
(74) *Attorney, Agent, or Firm* — Altera Law Group, LLC

(57) ABSTRACT

An earphone system (1; 23) comprising a wireless earphone (2; 20, 21) and a portable holding device (3; 22). The earphone (2; 20, 21) comprises an ear hook (8) for attaching the earphone (2; 20, 21) to the ear (14) of a user. The holding device (3; 22) comprises an outer surface (25) with an earphone recess (4; 30, 31) adapted for receiving the earphone (2; 20, 21) with the ear hook (8), such that the ear hook (8) follows the outer surface (25) of the holding device (3; 22), and attachment means for attaching the earphone (2; 20, 21) in the earphone recess (4; 30, 31).

12 Claims, 5 Drawing Sheets

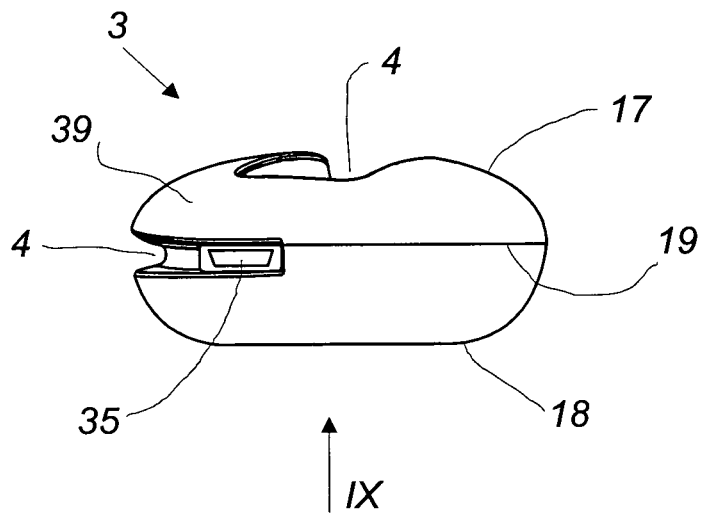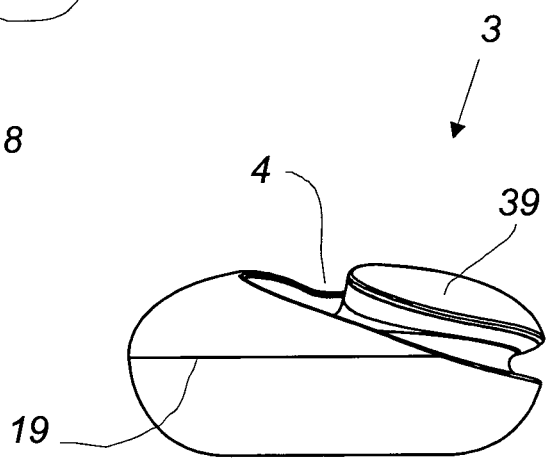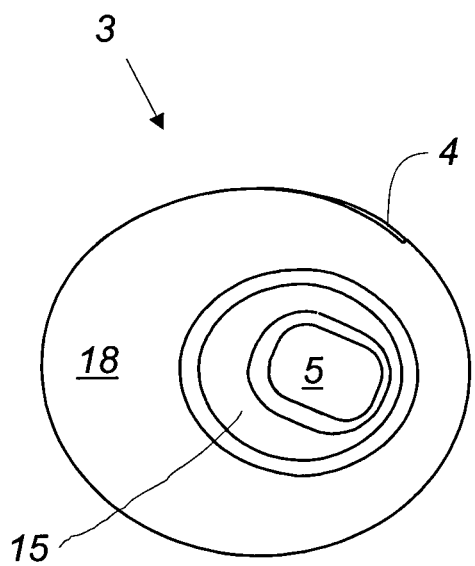

US 8,655,005 B2

EARPHONE SYSTEM COMPRISING AN EARPHONE AND A PORTABLE HOLDING DEVICE

TECHNICAL FIELD

The invention relates to an earphone system comprising a wireless earphone and a portable holding device, wherein the earphone comprises an ear hook for attaching the earphone to the ear of a user and the holding device comprises an outer surface.

BACKGROUND ART

Wireless earphones suitable for use with mobile phones are normally called headsets and are—when not in use—often carried by the owner in a pocket, pouch, bag or suitable holding device. Some earphones are provided with a holding device adapted for use with that specific earphone. A holding device protects the earphone and prevents it from being tangled or caught with other items in the pocket or bag. Some holding devices also function as chargers for recharging the earphone battery, when the earphone is arranged in the holding device. Thus, the holding device can work as a charging cradle, which via a transformer is connected to an electrical outlet. Some holding devices also comprise a charging battery for charging the earphone and thereby extending talk time and stand by time while the user being away from a wall plug. Motorola Mini H9 is such an earphone system.

There exist many different types of wireless earphones. An earphone typically comprises at least one earphone and a wearing device for attaching the earphone to the head of the user, such that sound from the earphone speaker enters the ear canal. The earphones can be secured to a user's head by different wearing devices. As examples, these can comprise a headband, a neckband, an "earring" surrounding the outer ear, an earbud, an ear gel, an ear mold or an ear hook. When ear buds, ear gels and ear molds are used as wearing devices, the earphone is simply attached to the user by inserting the wearing device into the ear of user, where it is held in place by the inner sides of the external ear or the ear canal.

An ear hook, which sometimes is referred to as ear clip, ear loop, ear hanger, or ear brace, is a curved or essentially C-shaped device, which is attached to or is an integrated part of an earphone device. In order to mount the earphone on the ear, the ear hook is arranged around the auricle, such that it partly encircles the root of the auricle and extends in the so-called post auricular sulcus. The term "root of the auricle" refers to the area of the outer ear where it protrudes from the side of the head. Postauricular sulcus is the depression behind the ear next to the head. The "auricle" is the externally visible cartilaginous structure of the external ear. Synonyms for auricle are "pinna" or "outer ear".

EP 1 414 221 B1 (Sony Ericsson Mobile Communications AB) discloses an earphone system comprising a wireless earphone and a carrying device, wherein the earphone comprises an ear hook for attaching the earphone to the ear of a user and the holding device comprises an outer surface. The holding device is embodied as a box with a hinged lid. The carrying device protects the earphone well but suffers from some drawbacks when it comes to user friendliness.

When earphones are provided with microphones and adapted for two-way communication, they are normally referred to as headsets. This invention covers theses headsets. However, the invention also covers hearing aids that amplify and modulate sounds for the wearer.

DISCLOSURE OF INVENTION

The object of the invention is to improve an earphone system according to the preamble of claim 1. The earphone system according to the invention is characterised in that the outer surface has an earphone recess adapted for receiving the earphone with the ear hook, such that the ear hook follows the surface of the holding device, and attaching means for attaching the earphone in the earphone recess. With such a system, it is possible to remove the earphone of the type which comprising an ear hook in a quick way. This is particularly advantageous if there is a phone call and the user needs to respond quickly. Furthermore, the holding device can be embodied sturdier as no movable or detachable lid is required.

According to an embodiment, the ear hook has an outer surface, which is aligned with the outer surface of the holding device, when the earphone is received by the earphone recess.

Preferably, the outer surface of the ear hook and the outer surface of the holding device together provide a continuous surface, when the earphone is received by the earphone recess. Thus, a particularly smooth surface can be obtained, which minimizes the risk of the earphone being tangled with other devices when carried in a pocket, bag or the like.

According to an embodiment, the holding device opposite the earphone recess comprises a release recess, which together with the earphone recess forms a through-going hole, so that a user via the release recess can press the earphone out of engagement with the earphone recess. With such an embodiment, the user can push the earphone out of engagement with the earphone recess with his/her finger or the like.

According to an alternative embodiment, a release button is arranged in the release recess, wherein the release button is adapted to push the earphone out of the earphone recess upon activation of the release button.

The outer surface of the holding device is preferably essentially convex. This counts for the surface area with exception of the earphone recess and optional release recess.

According to an embodiment, the outer surface of the holding device is essentially shaped as a flattened ball. Such a shape is comfortable to keep in a trouser pocket, even while running or bicycling.

The holding device can be essentially oval seen in the direction of a first axis and oval seen in a direction of a second axis, which is perpendicular to the first axis.

According to a preferred embodiment, the holding device is essentially oval seen in a direction of a third axis, which is perpendicular to the first axis and the second axis. Such a shape is particular suitable to adapt to the outer shape of an earphone with an ear hook.

According to an embodiment of the earphone system according to the invention, the ear hook is flexible, wherein the earphone recess and the ear hook are shaped such that the ear hook must be elastically deformed by means of an external force in order to move the earphone in to and out from the earphone recess. With this embodiment, the elasticity of the earhook is utilized to attach the earphone in the earphone recess. Thus, the flexible ear hook forms a part of the attachment means.

Preferably, the attachment means comprise an undercut portion of the holding device, which is partly encircled by the earphone recess. This is a simple and sturdy way of providing means for holding the earphone in the earphone recess.

According to a preferred embodiment, the earphone comprises a rechargeable earphone battery, and the holding device comprises a rechargeable holding device battery, wherein the earphone system is adapted such that the earphone battery can be recharged by the holding device battery, when the earphone is received by the earphone recess. In this case, the earphone can be recharged from the holding device, while the user being away from a wall plug. The charging can take place by induction or via corresponding terminals on the earphone and the holding device.

According to an embodiment, the system comprises a left ear earphone and a right ear earphone, and the holding device comprises a left ear earphone recess for receiving the left ear earphone and a right ear earphone recess for receiving the right ear earphone. Such a system can be utilized for listening to stereo music, two users simultaneously or a hearing aid system with hearing aids for both ears.

BRIEF DESCRIPTION OF THE DRAWINGS

The invention is explained in detail below with reference to the drawing illustrating a preferred embodiment of the invention and in which FIG. 7 is the holding device according to the first embodiment, seen in the second direction, FIG. 8 is the holding device according to FIG. 7, seen from the opposite side, FIG. 9 is the holding device according to FIG. 3, seen from the opposite side.

MODES FOR HOLDING OUT THE INVENTION

Figure 1:
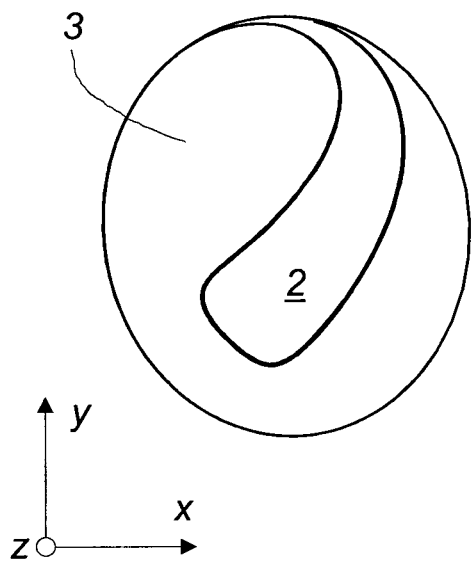
FIG. 1 is the earphone system comprising an earphone and a holding device according to a first embodiment of the invention, seen in a first direction.
Figure 2:
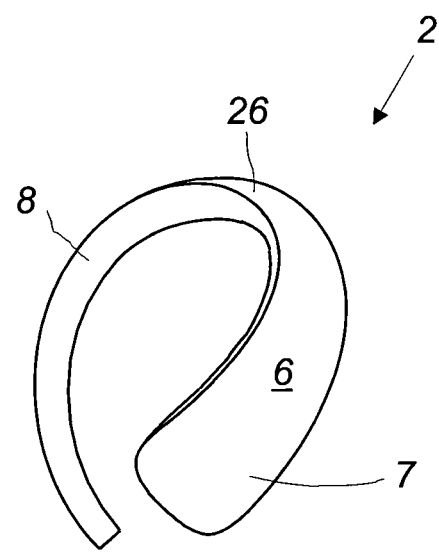
FIG. 2 is the earphone according to the first embodiment, seen in the first direction.
Figure 3:
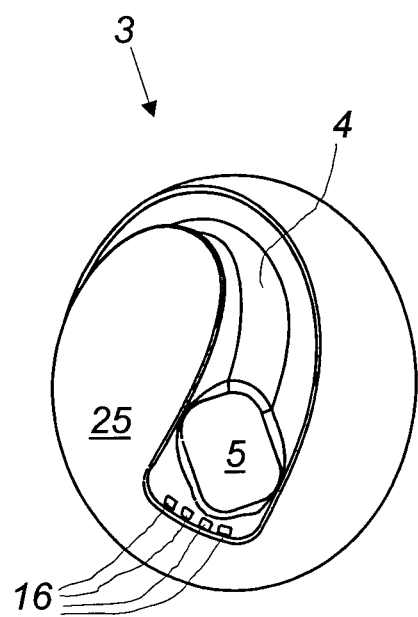
FIG. 3 is the holding device according to the first embodiment, seen in the first direction.
Figure 4:
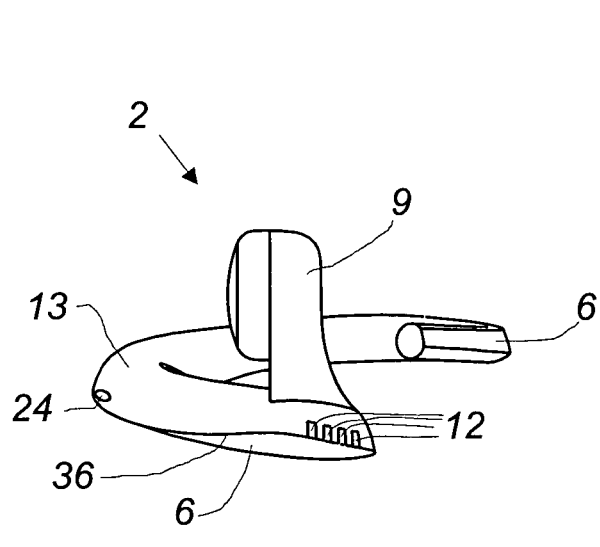
FIG. 4 is the earphone according to the first embodiment seen in a second direction.
Figure 5:
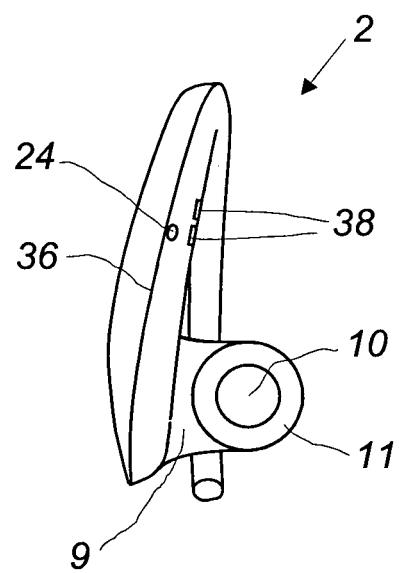
FIG. 5 is the earphone according to the first embodiment, seen in a third direction.

FIG. 1 discloses a first embodiment of an earphone system 1 according to the invention. The earphone system 1 comprises an earphone 2 and a holding device 3. The earphone is a wireless Bluetooth™ earphone 2 especially suitable for use with mobile phones. The holding device 3 serves several purposes: it can receive the earphone 2 when this is not in use, protect it during transportation and recharge it from an internal battery. FIGS. 2, 4 and 5 disclose the earphone 2 from different angles and FIGS. 3, 7, 8 and 9 show the holding device 3 from different angles. The earphone 2 comprises a main part 7 and an ear hook 8 adapted to be arranged the outer ear of the user, such that the main part 7 is placed in front of the ear canal. The main part 7 and the ear hook 8 are integrated parts of the earphone 2. The holding device 3 is shaped as an oblong flattened ball and is essential oval seen in the three orthogonal directions x, y and z indicated with the small Cartesian coordinate system in FIG. 1. An earphone receiving recess 4 is provided in the outer surface 25 of the holding device 3. The earphone 2 comprises an outer surface 6, which is in level with the outer surface 25 of the holding device 3, when the earphone 2 is received by earphone recess 4. Thus, a continuous surface is provided by the outer surface 6 of the earphone 2 and the outer surface 25 of the holding device 3. This means, that the earphone 3 when the system is kept in a pocket or a bag is well protected from being broken or tangled with other devices. Furthermore, an oval-shaped holding device with a smooth surface is more comfortable to keep in a trouser pocket than an ear hook fitted earphone alone.

The earphone 2 is provided with external contact pads 12 (FIG. 4), which are in contact with corresponding contact pads 16 in the earphone recess 4 (FIG. 3), when the earphone 2 is received by the earphone recess 4. The function of this will be explained further under the description of FIG. 10. The earphone 2 is provided with a hidden multifunction button, which is activated by pressing the outer surface 6 of the main part 7 of the earphone 2. This multifunction button is used for answering and ending calls, voice activated dialing, rejecting calls, redialing, swapping held calls and pairing. Volume up/down is implemented as touch control on the front. Thus, the user can turn the volume up and down by wiping his/her fingertip along the outer surface 6 of the main part 7 of the earphone 2.

FIGS. 4 and 5 disclose the earphone 2 from different angles. A relatively well-defined edge 36 divides the outer surface 6 from an inner surface 13, which is not visible, when the earphone 2 is arranged in the holding device 3. The main part 7 is provided with a microphone opening 24 on the inner surface 13 close to the edge 36. A speaker housing 9 protrudes from the main part 7 approximately perpendicular to the inner surface 13. A speaker grill 10 is surrounded by a soft rubber ring 11, which ensures a comfortable abutment against the ear. The inner surface 13 of the earphone 3 including the earhook 8 is rounded and provided with rubber to ensure comfort during use. Two light emitting diodes 38 provide status information such as connection status, battery status, pairing mode etc.

Figure 6:
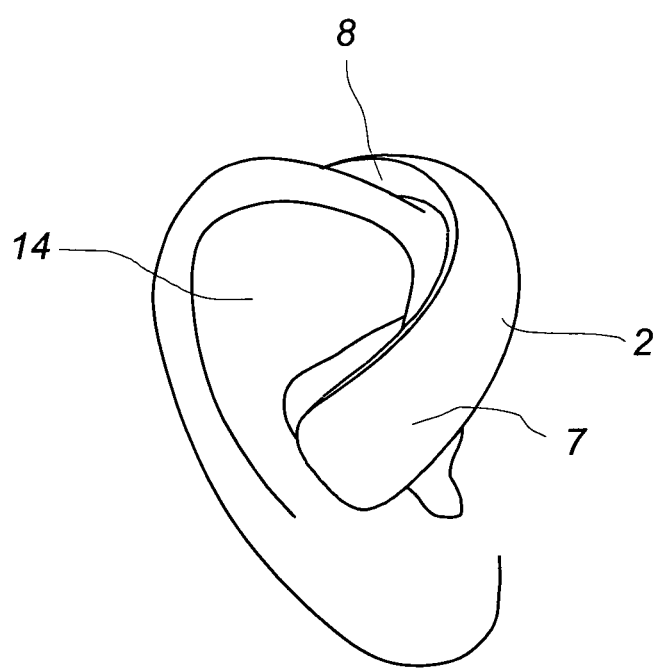
FIG. 6 is the earphone according to the first embodiment when arranged on the ear of a user, seen in the first direction.

FIG. 6 discloses the earphone 2 when arranged on the ear 14 of a user. As shown, the main part 7 of the earphone 2 is arranged in front of the ear canal, while the ear hook 8 grips behind the ear 14. The speaker housing 9 is arranged in the concha of the ear so that the audio leaving the speaker grill 10 enters the ear canal.

FIGS. 3 and 7-9 show the holding device 3 from different angles. As seen in FIG. 7 a peripheral edge 19 lies in a plane and divides the outer surface 25 of the holding device 3 into a front side 17 and a rear side 18. The portion of the recess 4 that receives the main part 7 is arranged in the front side 17. The portion of the recess 4 that receives the ear hook 8 extends along and crosses the peripheral edge 19. When the earphone 2 is inserted into the recess 4, the main part 7 of the earphone 2 is pressed in a direction essentially perpendicular to the plane defined by the peripheral edge 19 into the recess 4. When the main part 7 is pressed almost fully into the recess 4, the ear hook 8 is flexed outwards and an in a direction towards the rear side 18 until it snaps into ear hook receiving portion of the recess 4. Alternatively, the earhook 8 is pushed into the ear hook receiving portion of the recess 4, where after the main part 7 is flexed towards the main part receiving portion of the recess 4 where it snaps into engagement.

As clearly shown in FIG. 8, the earphone recess 4 defines an encircled portion 39 of the holding device, which is partly encircled by the earphone 2, when the latter is received by the earphone recess 4. This encircled portion 39 is undercut, whereby it in cross-section widens near the outer surface 25. When the earphone 2 is received by the earphone recess 4, it is in its relaxed state. In order to remove the earphone 2 from the recess 4, a forced must be applied sot that the main part 7 and the ear hook 8 are flexed away from each other. In this way, the risk of unintentional removal of the earphone 2 from the holding device 3 is minimized. As an alternative or addition to the undercut, the earphone receiving recess 4 and the earphone 2 could be provided with protrusions or locking tongues that engages corresponding holes or recesses when the earphone 2 is received by the earphone receiving recess 4. As FIG. 7 shows, the holding device 3 has a charging socket, which is embodied as a micro-USB socket 35.

The rear side 18 of the holding device 3 comprises a release recess 15. The bottom of this recess 15 is connected with the earphone receiving recess 4, such that a through going hole 5 is provided. In this way, the speaker housing 9 is visible and accessible via the release recess 15, whereby the user in an easy way can insert his/her finger into the release recess 15 and press the earphone 2 out of engagement with the earphone recess 4.

Figure 10:
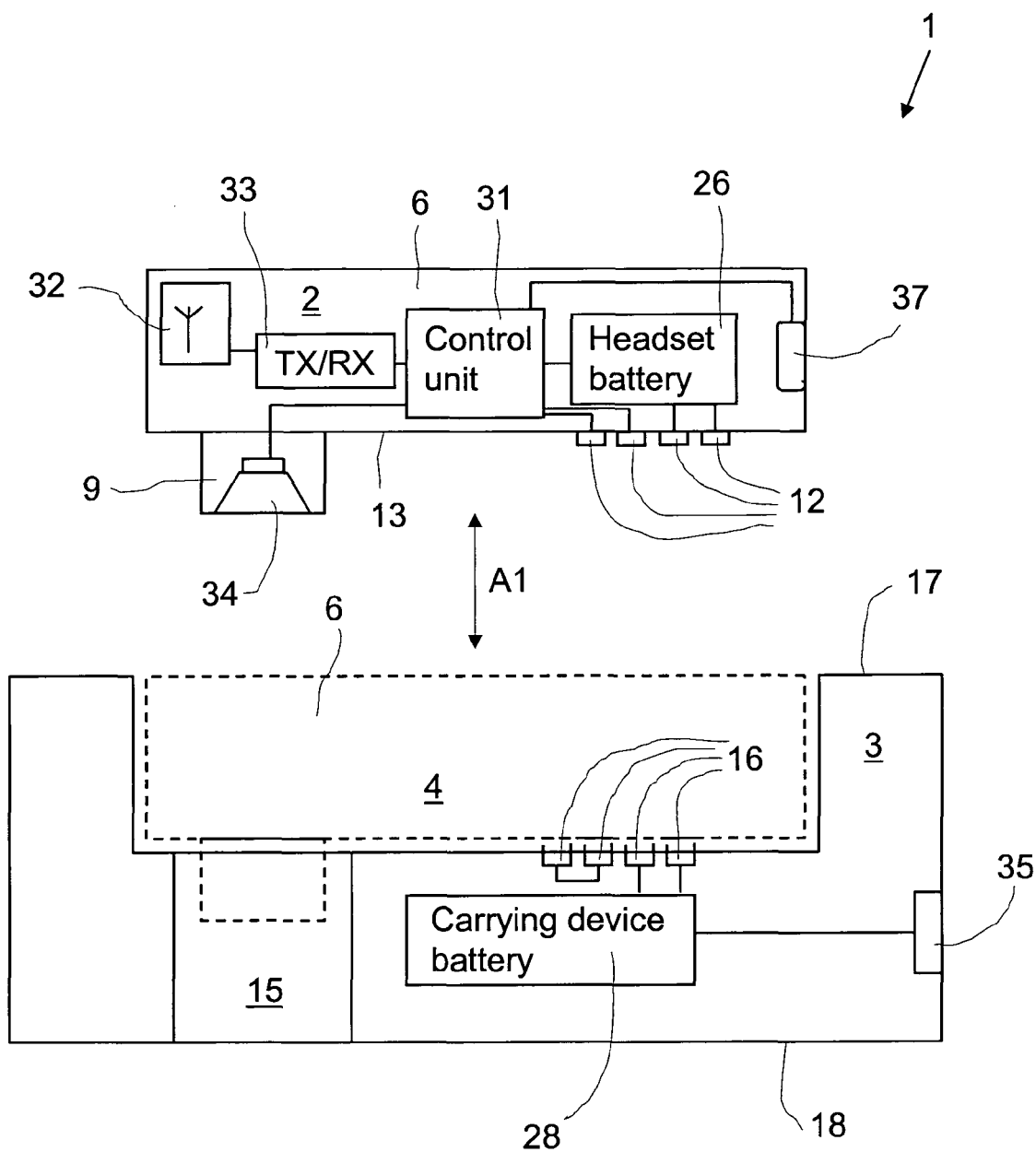
FIG. 10 is a schematic view through an earphone and a holding device according the invention.

FIG. 10 is a schematic view of an earphone 2 and a holding device 3 according the invention. This view is included in order to show the most essential internal parts of the earphone 2 and the holding device 3. The earphone 2 comprises in its interior a control unit 31, a Bluetooth™ transceiver 33, an antenna 32, a speaker 34, a microphone 37 and a rechargeable battery 26. The control unit 31 and the battery 26 are connected to the external contact pads 12. The drawing is only schematic. The location of the terminals is chosen for clarity reasons and differs from the first embodiment shown in FIGS. 1-9. The holding device 3 comprises an internal rechargeable battery 28, which is connected to a charging socket 35 and the contact pads 16.

The contact pads 12, 16 are also providing an on/off-function. The two earphone contact pads 12 most to the left are short cut by the corresponding two interconnected holding device contact pads 16, when the earphone 2 is received by the earphone recess 4. Thus, when the earphone 2 is arranged in the holding device 3, the earphone 2 is switched off. When the earphone 2 is removed from the holding device 3, the earphone 2 is switched on. This is a very simple and intuitive way of switching the earphone on and off.

Figure 11:
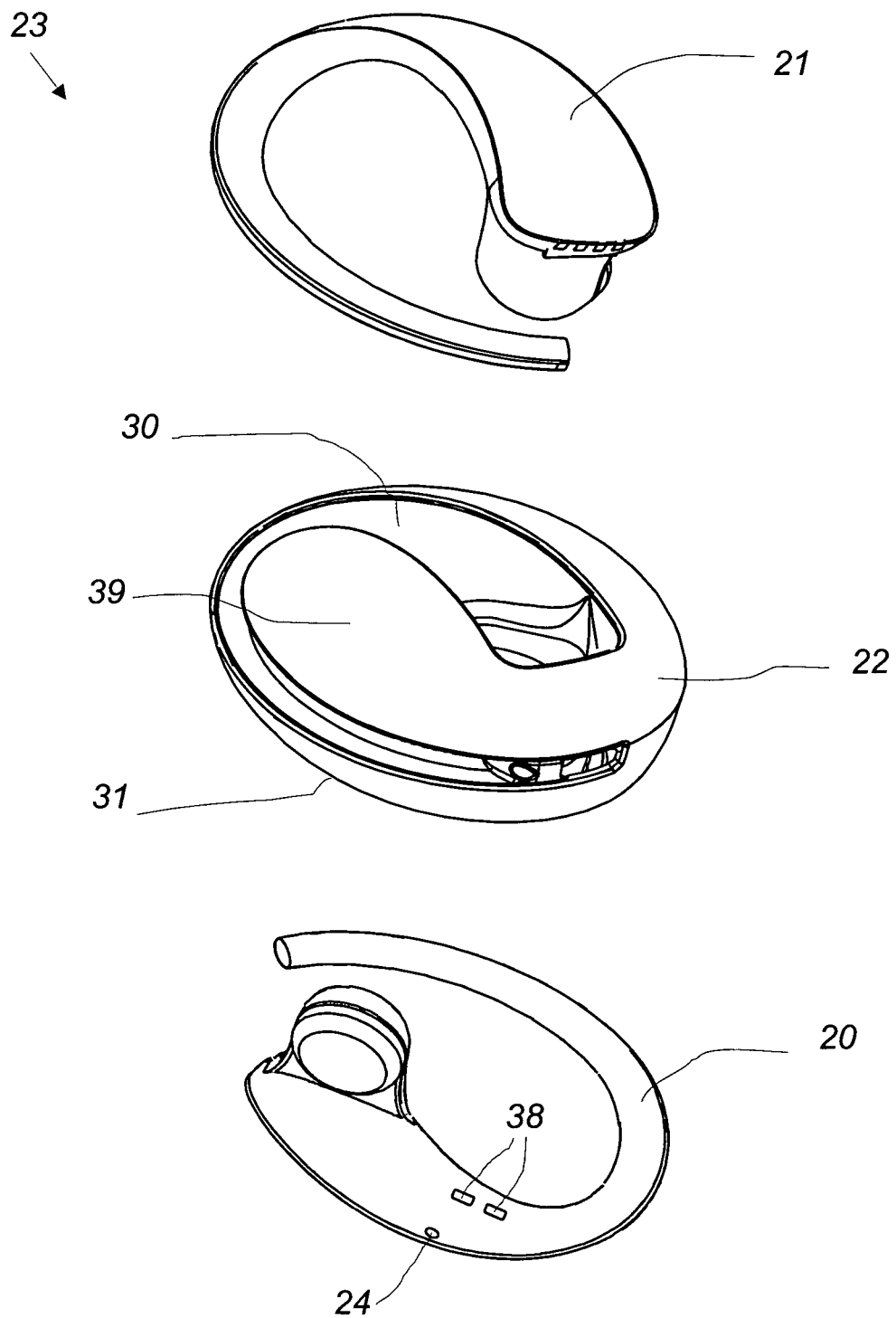
FIG. 11 is a perspective view of an earphone system according to a second embodiment of the invention.

FIG. 11 is a perspective view of an earphone system 23 according to a second embodiment of the invention. This earphone system comprises an earphone 21 for the right ear, an earphone 20 for the left ear and a holding device 22. The holding device 22 has two earphone receiving recesses 30, 31, where only the recess 30 for the right earphone 21 is visible in FIG. 11. It is not shown in FIG. 11, but this embodiment may also include release recesses, whereby the user easily can remove the earphones 21, 20 from the earphone receiving recesses 30, 31. This embodiment can be used for stereo music listening or as two hearing aids.

In both embodiments, the earphone holding device 3; 22 are made of undeformable material with no movable parts, whereby it can be made particularly sturdy.

The holding devices 3; 22 can also be embodied without a battery 28 and serve as a simple charging cradle. The holding device 3; 22 could also include a transformer/adapter, whereby only a cord is needed to connect the holding device 3; 22 to a wall socket.

The holding device 3; 22 is preferably provided with visual indication of the charging status of the holding device battery 28. This can be a LED-window that lightens red, yellow and green in dependence on the charging status.

The earphone 2; 20, 21 and the holding device 3; 22 can be provided with magnetic means to hold the earphone more firmly in the earphone receiving recess 4; 30, 31.

The release recess 15, could be provided with a release button, which when pushed exerts a pushing force on the earphone 2; 20, 21 and releases it from the earphone receiving recess 4; 30, 31.

The embodiments disclosed here are headsets to be used for communication, especially telecommunication. Thus, the term earphone could be replaced by the term headset. However, the wireless earphone according to the invention could also be embodied as a hearing aid, whereby sounds from the surroundings are captured by the microphone and processed in order to compensate for the users hearing impairment before it is sent to the speaker. Thus, the term earphone could be replaced by the term hearing aid or hearing instrument. In addition, a combined wireless earphone for telecommunication and hearing aid is within the scope of the invention.

| Reference signs | |
|---|---|
| 1 | earphone system |
| 2 | earphone |
| 3 | holding device |
| 4 | earphone recess in holding device |
| 5 | through going hole in earphone holding device |
| 6 | outer surface of earphone |
| 7 | main part of earphone |
| 8 | ear hook |
| 9 | speaker housing |
| 10 | speaker grill |
| 11 | rubber ring |
| 12 | contact pads on earphone |
| 13 | inner surface of earphone |
| 14 | ear of user |
| 15 | release recess in holding device |
| 16 | contact pads of holding device |
| 17 | front side of holding device |
| 18 | rear side of holding device |
| 19 | peripheral edge of holding device |
| 20 | earphone for left ear |
| 21 | earphone for right ear |
| 22 | double earphone holding device |
| 23 | double earphone system |
| 24 | microphone opening |
| 25 | outer surface of holding device |
| 26 | outer surface of ear hook |
| 27 | rechargeable battery of earphone |
| 28 | rechargeable battery of holding device |
| 29 | left ear earphone recess |
| 30 | right ear earphone recess |
| 31 | earphone control unit |
| 32 | earphone antenna |
| 33 | earphone transceiver |
| 34 | earphone speaker |
| 35 | earphone holding device charging socket |
| 36 | edge between inner and outer surface of earphone housing |
| 37 | microphone |
| 38 | light emitting diode |
| 39 | ear hook encircled portion of holding device |

The invention claimed is:

1. An earphone system comprising a wireless earphone and a portable holding device, wherein the earphone comprises an ear hook for attaching the earphone to the ear of a user and the holding device comprises an outer surface, wherein the outer surface of the holding device has an earphone recess adapted for receiving the earphone with the ear hook, such that the ear hook follows the outer surface of the holding device, and attachment means for attaching the earphone in the earphone recess, and wherein the holding device comprises a release recess, which together with the earphone recess forms a through-going hole, so that a user via the release recess can press the earphone out of engagement with the earphone recess, and wherein the outer surface of the ear hook which extends around at least a part of the users auricle and the outer surface of the holding device and earphone together provide a generally smooth continuous surface, when the earphone is received by the earphone recess.

2. An earphone system according to claim 1, wherein the ear hook has an outer surface, which is aligned with the outer surface of the holding device, when the earphone is received by the earphone recess.

3. An earphone system according to claim 2, wherein the outer surface of the ear hook and the outer surface of the holding device together provide a continuous surface without surface projections, when the earphone is received by the earphone recess.

4. An earphone system according to claim 1, wherein the ear hook is flexible, and wherein the earphone recess and the ear hook are shaped such that the ear hook must be elastically deformed by an external force in order to move the earphone in to and out from the earphone recess.

5. An earphone system according claim 4, wherein the attachment comprises an undercut portion of the holding device, which is partly encircled by the earphone recess.

6. An earphone system according to claim 1, wherein the earphone comprises a rechargeable earphone battery, and the holding device comprises a rechargeable holding device battery, and wherein the earphone includes a generally linear edge at one end, said linear edge including a plurality of electrical charging contacts and wherein the holding device includes a like linear edge with like contacts, to supply power to said battery.

7. An earphone system according to claim 1, wherein the system comprises a left ear earphone and a right ear earphone, and the holding device comprises a left ear earphone recess on one surface of the holder for receiving the left ear earphone and a right ear earphone recess on the opposite side of the holder for receiving the right ear earphone.

8. An earphone system according to claim 1, wherein the earphone includes a speaker and wherein the speaker is oriented generally orthogonal to the ear hook.

9. An earphone system comprising a wireless earphone and a portable holding device, wherein the earphone comprises an ear hook for attaching the earphone to the ear of a user and the holding device comprises an outer surface, wherein the outer surface of the holding device has an earphone recess adapted for receiving the earphone with the ear hook, such that the ear hook follows the outer surface of the holding device, and attachment means for attaching the earphone in the earphone recess, and wherein the holding device comprises a release recess, which together with the earphone recess forms a through-going hole, so that a user via the release recess can press the earphone out of engagement with the earphone recess and wherein the outer surface of the holding device is essentially convex.

10. An earphone system according to claim 9, wherein the outer surface of the holding device is essentially shaped as a flattened ball.

11. An earphone system according to claim 9, wherein the holding device is essentially oval seen in the direction of a first axis (X) and oval seen in a direction of a second axis (Y), which is perpendicular to the first axis (X).

12. An earphone system according to claim 11, wherein the holding device is essentially oval seen in a direction of a third axis (Z), which is perpendicular to the first axis (X) and the second axis (Y).

* * * * *